US011019002B2

(12) United States Patent
Sahney et al.

(10) Patent No.: US 11,019,002 B2
(45) Date of Patent: May 25, 2021

(54) SECURE ELECTRONIC MESSAGING WITH DYNAMIC CONTENT

(71) Applicant: Google LLC, Mountain View, CA (US)

(72) Inventors: Aakash Sahney, Toronto (CA); Raymond Wainman, Kitchener (CA); Daniel George Calvert, St. Agatha (CA); Matthew James Bolohan, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 434 days.

(21) Appl. No.: 15/843,574

(22) Filed: Dec. 15, 2017

(65) Prior Publication Data
US 2019/0190859 A1     Jun. 20, 2019

(51) Int. Cl.
*H04L 12/58*     (2006.01)
*G06Q 10/10*     (2012.01)
(Continued)

(52) U.S. Cl.
CPC .......... *H04L 51/04* (2013.01); *G06F 21/6218* (2013.01); *G06Q 10/10* (2013.01); *G06Q 10/107* (2013.01); *G06Q 10/109* (2013.01); *H04L 51/16* (2013.01); *H04L 51/18* (2013.01); *H04L 51/32* (2013.01); *H04L 63/083* (2013.01)

(58) Field of Classification Search
CPC ......... H04L 51/04; H04L 51/18; H04L 51/16; H04L 51/32; H04L 63/083; G06Q 10/107; G06Q 10/109; G06Q 10/10; G06F 21/6218
See application file for complete search history.

(56) References Cited

U.S. PATENT DOCUMENTS 6,463,461 B1    10/2002    Hanson et al.
8,930,473 B2    1/2015    Thazhmon et al.
(Continued)

FOREIGN PATENT DOCUMENTS

EP     0957440 A2     11/1999
EP     1868147 A1     12/2007
EP     1868147 A1 *     12/2007     ........... G06Q 10/109

OTHER PUBLICATIONS

International Search Report and Written Opinion of International Application No. PCT/US2018/051108, dated Nov. 30, 2018, 65 pp.
(Continued)

*Primary Examiner* — Kevin T Bates
*Assistant Examiner* — Ronak Patel
(74) *Attorney, Agent, or Firm* — Shumaker & Sieffert, P.A.

(57) ABSTRACT

A computing device is described that receives an electronic message encoded with first rendering instructions and second rendering instructions. The first rendering instructions are accelerated mobile pages instructions and the second rendering instructions are at least one of plain text or hypertext markup language instructions. The computing device generates a rendering of the electronic message by at least: rendering the second rendering instructions, while refraining from rendering the first rendering instructions, in response to determining that the first rendering instructions are not valid accelerated mobile pages instructions. The computing device outputs, using a display, the rendering of the electronic message.

17 Claims, 7 Drawing Sheets

(51) Int. Cl.
    *G06F 21/62*     (2013.01)
    *H04L 29/06*     (2006.01)

(56) References Cited

U.S. PATENT DOCUMENTS

| | | | |
|---|---|---|---|
| 9,053,083 B2* | 6/2015 | Waldman | G06F 40/18 |
| 2004/0068695 A1* | 4/2004 | Daniell | H04L 51/04 |
| | | | 715/234 |
| 2012/0101907 A1* | 4/2012 | Dodda | H04L 67/02 |
| | | | 705/14.73 |
| 2012/0198528 A1* | 8/2012 | Baumhof | H04L 9/3228 |
| | | | 726/6 |
| 2012/0254321 A1 | 10/2012 | Lindsay et al. | |
| 2013/0218985 A1 | 8/2013 | Thazhmon et al. | |
| 2014/0109041 A1* | 4/2014 | Yunten | H04L 67/42 |
| | | | 717/109 |
| 2014/0344705 A1* | 11/2014 | Dimitrov | H04L 67/42 |
| | | | 715/744 |
| 2016/0117298 A1* | 4/2016 | Lemonik | H04L 67/42 |
| | | | 715/229 |
| 2019/0073365 A1* | 3/2019 | Jamshidi | G06F 16/9535 |

OTHER PUBLICATIONS

LiveClicker, "Realtime Capabilities," retrieved from http://www.realtime.email/solution/, accessed on Oct. 25, 2017, 12 pp.
International Preliminary Report on Patentability from International Application No. PCT/US2018/051108, dated Jun. 25, 2020, 10 pp.
Response to Communication Pursuant to Rules 161(1) and 162 EPC from counterpart EP Application No. 18789518.0 dated Dec. 19, 2019, filed Jun. 16, 2020, 13 pgs.

* cited by examiner

```
Subject: <>
From: <>
To: <>
Content-Type: multipart/alternative; boundary="001a113993d04aa41b05518cbb33"

--001a113993d04aa41b05518cbb33
Content-Type: text/plain; charset="UTF-8"; format=flowed; delsp=yes <plain text body goes here>

--001a113993d04aa41b05518cbb33
Content-Type: text/amp-html; charset="UTF-8"
Content-Transfer-Encoding: quoted-printable <AMP html goes here>

--001a113993d04aa41b05518cbb33--
```

602 — (plain text body section)
604 — (AMP html section)
600

FIG. 6

SECURE ELECTRONIC MESSAGING WITH DYNAMIC CONTENT

BACKGROUND

Some computing systems provide electronic messaging (e.g., e-mail) services that facilitate quick and easy communication between users of computing devices. Unfortunately, in some cases due to security reasons (e.g., preventing malicious code) or for maintaining system efficiency or ease of use, some computing systems only allow electronic message content that is static and not interactive or dynamic. Accordingly, some electronic message content can become stale, soon after a message is received, before a user has an opportunity to digest the message, or after a user revisits a message that previously included current information. Even if an electronic message's content is informative and up-to-date, the content may not allow user actions from within the electronic communication itself. And in some cases, the content may be less engaging than content contained in other forms of communication.

SUMMARY

In general techniques of this disclosure are directed to enabling the exchange of electronic communications that includes a secure form of dynamic content. An example computing system (such as an e-mail system) is described that is configured to handle electronic messages that include at least two forms of rendering instructions. The first form of instructions are accelerated mobile pages (AMP) instructions. The AMP instructions, having been adapted from their typical use in generating mobile webpage content and advertisements, provide a secure way for devices to render dynamic content that can change over time. The dynamic content can even support user actions from within the electronic communications. Whereas the second form of instructions are for generating a traditional, static type of content. Such instructions include at least one of hypertext markup language (HTML) instructions or plain text instructions.

When an electronic communication is received that includes both forms of rendering instructions, the example computing system renders either the HTML/plain text instructions or the AMP instructions, depending on various conditions. In some cases, rather than render the HTML/plain text instructions, the example computing system automatically renders the AMP instructions to provide dynamic content of a message in response to validating the AMP instructions and confirming that the AMP instructions conform to the AMP specification. In another case, the example computing system renders AMP instructions, only after receiving explicit permission from a user to do so. And in some instances, the example computing system renders AMP instructions, only after obtaining credentials from the user that are needed to access secured content being referenced by the AMP instructions. In instances where user permission is not obtained, credentials are not obtained, or where the AMP instructions cannot be validated, the example computing system renders the HTML/plain text instructions.

In this way, the example computing system provides a secure environment for rendering electronic message content that is dynamic or facilitates user interactions. The example computing system renders the dynamic version of content when one of the above conditions is satisfied and when both of the above conditions is not satisfied, the example computing system renders fallback content defined by the HTML or plain text instructions. Such an example computing system may improve electronic communications by enabling electronic communications to have a secure form of engaging, dynamic content as well as an alternate form of static content when rendering the dynamic content is not appropriate. By enabling AMP based electronic communications, particularly for e-mail communication, message content can be interactive, dynamic and not become stale. Instead, the dynamic message content can update as information changes and a user can interact with the dynamic message content from within the message itself (e.g., rather than navigating outside the message to a webpage or some other external source). Furthermore, because all AMP instructions being used to generate AMP content are, by definition, validated and pass an AMP security review before rendering, AMP instructions are inherently secure, particularly when compared to standard (i.e., non-AMP) HTML instructions, non-AMP java script instructions, or other non-AMP forms of instructions. An example computing system may therefore not only provide a less frustrating more enjoyable user experience for enjoying dynamic content, the example computing system may further provide a more secure environment for enjoying said dynamic content.

Although described primarily from the perspective of AMP instructions as being "the first form of rendering instructions", in some cases, an example computing device or computing system may rely on a different form of dynamic content rendering instructions. That is, the first form of rendering instructions may be any other type of rendering instructions (e.g., a proprietary set of rendering instructions that facilitate rendering of dynamic content) that can be validated for adherence to a specification, so that the instructions can be trusted to be free from malicious instructions, and therefore execute without impacting security, performance, or other system or resource concerns.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

In one example, a method is described that includes receiving, by a mail client executing at a computing device, an electronic message encoded with first rendering instructions and second rendering instructions, the first rendering instructions being accelerated mobile pages instructions and the second rendering instructions being at least one of plain text or hyper-text markup language instructions; generating, by the mail client, a rendering of the electronic message by at least: rendering the second rendering instructions, while refraining from rendering the first rendering instructions, in response to determining that the first rendering instructions are not valid accelerated mobile pages instructions; and outputting, by the mail client, for display, the rendering of the electronic message.

In another example, a computing device is described that includes a display; and at least one processor configured to execute a mail client configured to: receive an electronic message encoded with first rendering instructions and second rendering instructions, the first rendering instructions being accelerated mobile pages instructions and the second rendering instructions being at least one of plain text or hyper-text markup language instructions; generate a rendering of the electronic message by at least: rendering the second rendering instructions, while refraining from rendering the first rendering instructions, in response to determining that the first rendering instructions are not valid accelerated mobile pages instructions; and output, using the display, the rendering of the electronic message.

In another example, a computer-readable storage medium is described that includes instructions associated with a mail client, that when executed, cause at least one processor of a computing device to: receive an electronic message encoded with first rendering instructions and second rendering instructions, the first rendering instructions being accelerated mobile pages instructions and the second rendering instructions being at least one of plain text or hyper-text markup language instructions; generate a rendering of the electronic message by at least: rendering the second rendering instructions, while refraining from rendering the first rendering instructions, in response to determining that the first rendering instructions are not valid accelerated mobile pages instructions; and output, for display, the rendering of the electronic message.

In another example, a system is described that includes means for receiving an electronic message encoded with first rendering instructions and second rendering instructions, the first rendering instructions being accelerated mobile pages instructions and the second rendering instructions being at least one of plain text or hyper-text markup language instructions; means for generating a rendering of the electronic message by at least: rendering the second rendering instructions, while refraining from rendering the first rendering instructions, in response to determining that the first rendering instructions are not valid accelerated mobile pages instructions; and means for outputting, for display, the rendering of the electronic message.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 6 is a conceptual diagram illustrating example rendering instructions of an electronic message, in accordance with one or more aspects of the present disclosure.

DETAILED DESCRIPTION

Figure 1A:
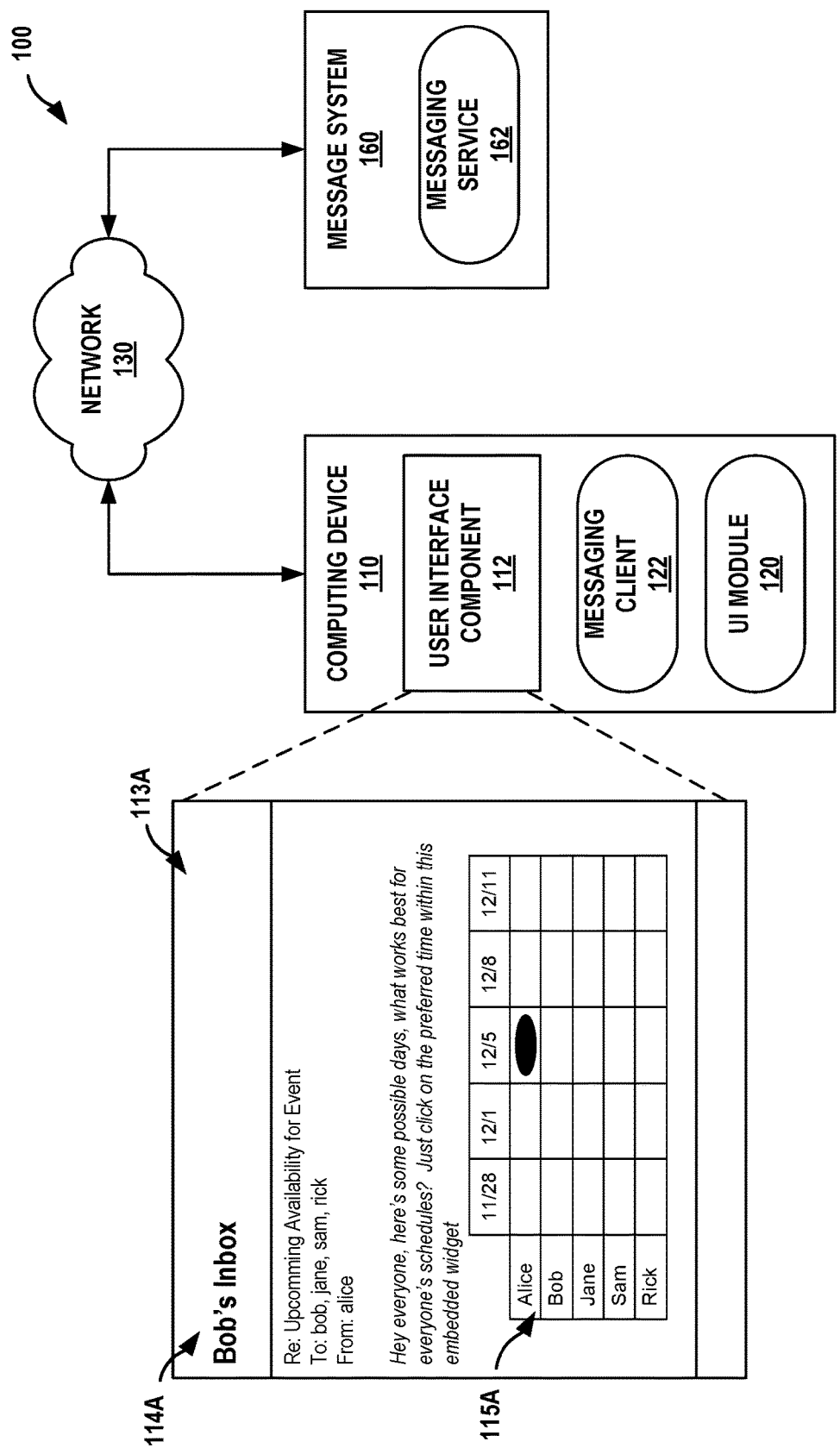
FIGS. 1A-1C are conceptual diagrams illustrating an example computing system configured to exchange electronic communications that include a secure form of dynamic electronic messaging content, in accordance with one or more aspects of the present disclosure.
Figures 1B, 1C:
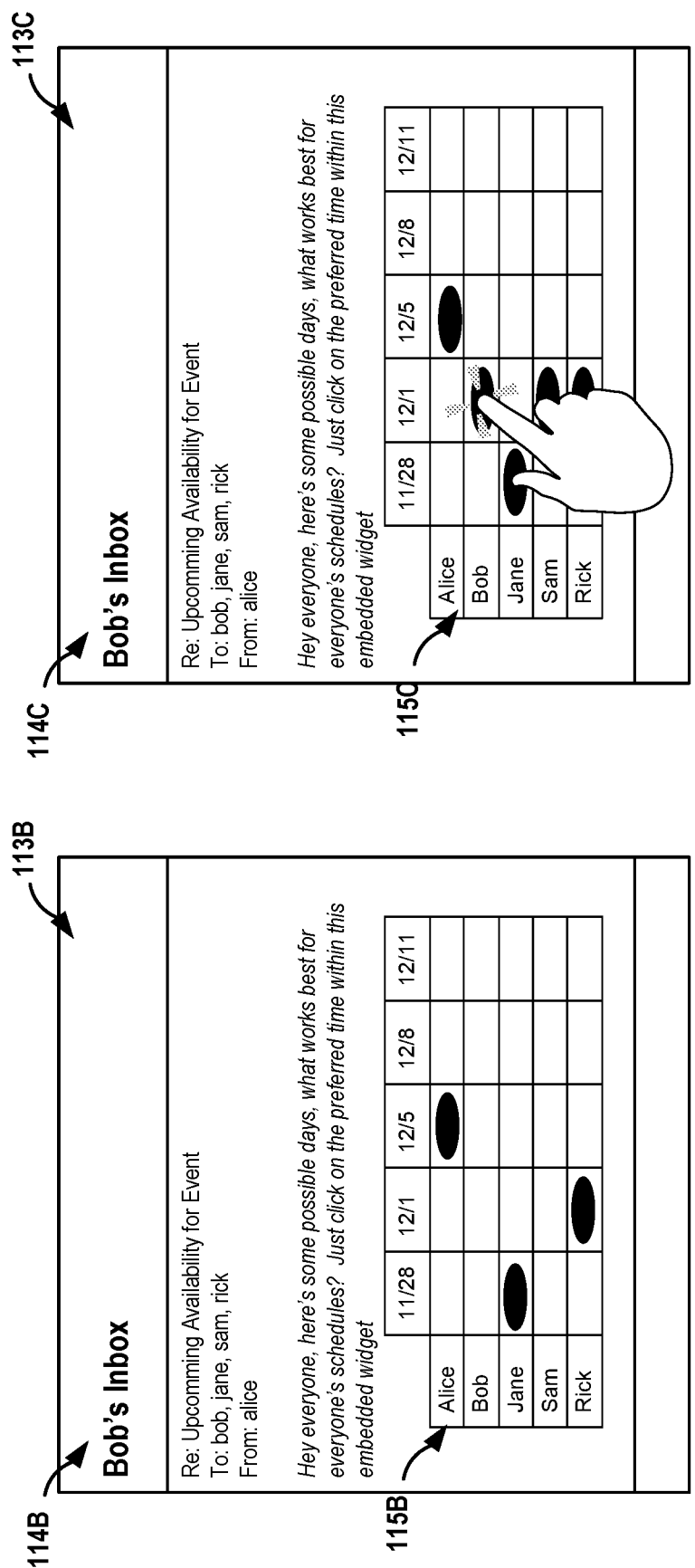

FIGS. 1A-1C are conceptual diagrams illustrating an example computing system configured to exchange electronic communications that include a secure form of dynamic electronic messaging content, in accordance with one or more aspects of the present disclosure. System 100 of FIG. 1A includes message system 160 in communication, via network 130, with computing device 110. Although system 100 is shown as being distributed amongst digital message system 160 and computing device 110, in other examples, the features and techniques attributed to system 100 may be performed internally, by local components of computing device 110.

Network 130 represents any public or private communications network, for instance, cellular, Wi-Fi, and/or other types of networks, for transmitting data between computing systems, servers, and computing devices. Message system 160 may exchange data, via network 130, with computing device 110 to provide a messaging service that is accessible to computing device 110 when computing device 110 is connected to network 130. Network 130 may include one or more network hubs, network switches, network routers, or any other network equipment, that are operatively intercoupled thereby providing for the exchange of information between message system 160 and computing device 110. Computing device 110 and message system 160 may transmit and receive data across network 130 using any suitable communication techniques. Computing device 110 and message system 160 may each be operatively coupled to network 130 using respective network links. The links coupling computing device 110 and message system 160 to network 130 may be Ethernet or other types of network connections and such connections may be wireless and/or wired connections.

Message system 160 represents any suitable remote computing system, such as one or more desktop computers, laptop computers, mainframes, servers, cloud computing systems, etc., that is configured to host an electronic messaging service. For example, messaging system 160 may be one or more mail servers configured to provide an e-mail messaging service. Computing device 110 represents an individual mobile or non-mobile computing device that is configured to access the messaging service provided by message system 160. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to access an electronic messaging service.

Message system 160 includes messaging service module 162; computing device 110 includes user interface component ("UIC") 112, user interface ("UI") module 120, and messaging client module 122. Modules 120, 122, and 162 may perform operations described herein using software, hardware, firmware, or a mixture of hardware, software, and firmware residing in and/or executing at computing device 110 and messaging system 160. Computing device 110 and message system 160 may execute modules 120, 122, and 162 with multiple processors or multiple devices, as virtual machines executing on underlying hardware, as one or more services of an operating system or computing platform, and/or as one or more executable programs at an application layer of a computing platform of computing device 110 or message system 160.

UIC 112 of computing device 110 functions as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. As an input device, UIC 112 detects input (e.g., touch and non-touch input) from a user of computing device 110. Examples of user input gestures performed by a user (e.g., the user touching, pointing, and/or swiping at or near one or more locations of UIC 112 with a finger or a stylus pen). As an output device, UIC 112 presents information (e.g., audible, visual, and/or haptic information) to a user in the form of a user interface (e.g., user interface 113).

UI module 120 of computing device 110 controls UIC 112 including determining what UIC 112 presents and what information is exchanged between UIC 112 and other applications or components of computing device 110. For example, in controlling what UIC 112 displays, UI module 120 may receive information from a component of computing device 110, such as messaging client module 122, for generating user interface 113 and elements thereof. In response, UI module 120 may output instructions and information to UIC 112 that cause UIC 112 to display user interfaces 113A-113C (collectively "user interfaces 113") according to the information received from messaging client module 122. When handling input detected by UIC 112, UI module 120 may receive information from UIC 112 in response to inputs detected at locations of a screen of UIC 112 at which elements of user interface 113 are displayed. UI module 120 disseminates information about inputs detected by UIC 112 to other components of computing device 110 for interpreting the inputs and for causing computing device 110 to perform one or more functions in response to the inputs.

Messaging client module 122 and messaging service module 162 communicate via network 130 to provide a messaging service to computing device 110. Examples of a messaging service include: e-mail service, text messaging service, simple service messaging, social media messaging service, voice message service, video message service, or any other service that facilitates the exchange of human-readable electronic messages. As used throughout the disclosure, the term "electronic message" is used to generally describe any type of human-readable electronic message that might be transmitted between computing devices. Examples of electronic messages include: instant messages, chat messages, electronic mail (e-mail) messages, social media communications, voicemail messages, video messages, or any other type of person-to-person communication that is accessed via a computing device.

Messaging client module 122 provides the front-end, user facing features of the messaging service whereas messaging service module 162 supports the back-end operations needed to implement the messaging service on network 130. Messaging client module 122 is a portal from which computing device 110 accesses electronic messages stored at message system 160 and/or at computing device 110. Messaging client module 122 may be an e-mail application, web application, or other module executing at computing device 110 that communicates with message system 160 to provide a user of computing device 110 with access to messages maintained at message system 160 and/or computing device 110.

Messaging service module 162 processes electronic messages received via network 130 from computing device 110 as well as other computing devices and messaging systems that are communicating via network 130. Messaging client module 122 processes inbound electronic messages received via network 130 from message system 160 and sends, via network 130, outbound electronic messages to messaging service module 162 for further processing.

Messaging client module 122 and messaging service module 162 maintain a messaging account associated with a user of computing device 110. That is, messages sent from or received by computing device 110 may be stored in a sent box or an inbox of a messaging account associated with a user of computing device 110. The sent box and inbox may be maintained in memory of computing device 110 and/or message system 160.

In a simple case, when handling an inbound message that is destined for computing device 110, messaging service module 162 receives (e.g., via network 130) an electronic message for processing. Messaging service module 162 determines (e.g., from metadata of the electronic message) one or more recipients of the electronic message. If one of the recipients is a messaging account associated with the user of computing device 110, messaging service module 162 may cause a copy of the electronic message to be stored in an inbox of the messaging account associated with the user of computing device 110, whether that messaging account is stored locally at messaging system 160 or computing device 110.

Likewise, when handling an outbound message that originated from computing device 110, messaging service module 162 receives (e.g., via network 130) an electronic message for processing. Messaging service module 162 determines (e.g., from metadata of the electronic message) one or more recipients of the electronic message and sends the message to devices or message systems associated with the one or more recipients. Messaging service module 162 may cause a copy of the electronic message being sent to be stored as a sent item in the messaging account associated with the user of computing device 110, whether that messaging account is stored locally at messaging system 160 or computing device 110.

Messaging service module 162 and messaging client module 122 are configured to provide user interfaces 113. User interfaces 113 represent a graphical user interface from which a user of computing device 110 can interact with the messaging service accessed by computing device 110 and provided by message system 160.

User interfaces 113 each include a view of an inbox of a messaging service mailbox. Within the inbox, user interfaces 113 each include a respective, rendering 114A-114C (collectively "renderings 114") of an electronic message that is contained in the inbox. Within each of renderings 114 is respective, dynamic content 115A-115C (collectively "dynamic content 115"). In the examples of FIGS. 1A-1C, each instance of dynamic content 115 is shown as an interactive poll or survey from which users can select a preferred date for an event.

The source of dynamic content 115 may be an application or component executing locally at computing device 110 or messaging system 160, or an application or component executing at some other computing location that is accessible via network 130. For example, dynamic content 115 may be stored at a server communicating on network 130 and accessible, from an internet browser, via a particular uniform resource locator (URL). However, rather than display a link to the particular URL at which dynamic content 115 is stored, messaging client module 122 and messaging service module 162 are configured to render dynamic content 115 locally as part of generating renderings 114.

In addition, messaging client module 122 and messaging service module 162 update renderings 114 to include updated versions of dynamic content 115 as the dynamic content 115 changes at the source. For instance, FIGS. 1A-1C show how renderings 114 and dynamic content 115 changes overtime as the dynamic content 115 changes at its source, e.g., in response to user inputs associated with dynamic content 115 from other recipients of the electronic message included in the inbox of user interface 113. For example, in FIG. 1A, only Alice has responded to the poll and therefore the poll is shown as dynamic content 115A. In FIG. 1B, Jane and Rick have weighed in on the poll and therefore rendering 114B includes dynamic content 115B. Lastly, in FIG. 1C, Same and ultimately, Bob, provide their respective answers to the poll and therefore renderings 114C includes dynamic content 115C.

Messaging service module 162 and messaging client module 122 are configured to process instructions contained within electronic messages to generate renderings 114, including dynamic content 115 of renderings 114. Messaging service module 162 and messaging client module 122 can handle at least two forms of electronic message instructions.

A first form of instructions supported by message service module 162 and messaging client module 122 include AMP instructions. When rendered, the first form of instructions may cause the rendering to include dynamic content that has been validated and deemed secure and may change over time and/or facilitate user interactions. Whereas, a second form of instructions supported by message service module 162 and messaging client module 122 include at least one of hypertext markup language (HTML) instructions, plain text instructions, and the like. When rendered, the second form of instructions cause the rendering to include static content that is widely supported by most other electronic communication systems and that does not change over time and does not enable user interactions.

Messaging service module 162 and messaging client module 122 are configured to generate, exchange, and render messages that have both HTML or plain text rendering instructions as well as AMP rendering instructions. Modules 122 and 162, either automatically or based on user input, determine at the time of rendering, which rendering instructions to use.

In accordance with techniques of this disclosure, messaging client module 122 of computing device 110 receives an electronic message from messaging service module 162 of message system 160. The electronic message is encoded with first rendering instructions and second rendering instructions. The first rendering instructions are AMP instructions and the second rendering instructions are at least one of plain text or HTML instructions. For example, the user of computing device 110 (also referred to as "Bob") has an e-mail account that he accesses via messaging client module 122. Messaging client module 122 may cause UI module 120 and UID 112 to display user interfaces 113 so that the user of computing device 110 can read or compose e-mail messages associated with his e-mail account. The e-mail account may receive an e-mail from Bob's friend named Alice. The e-mail may also go to additional e-mail recipients of other computing devices. The other recipients may be Jane, Sam, and Rick. The user of computing device 110 may provide input at UID 112 (e.g., voice input, touch input, etc.) that is interpreted by UI module 120 and messaging client module 122 as a user command to view the e-mail from Alice.

To make it easier to obtain each recipient's feedback, Alice has included in her e-mail, AMP rendering instructions for causing a recipient client device, such as computing device 10, to generate dynamic content 115, which in this example, is an interactive polling widget. While the results of the poll may be stored at a remote service connected to network 130 that is accessible via a URL, the AMP instructions, when rendered, cause the interactive polling widget to automatically update when the polling results change. The user of computing device 110 can view up-to-date polling results from within user interfaces 113 and without having to navigate to a URL outside of user interface 113.

In addition to the AMP instructions, Alice has also included in her e-mail HTML or plain text rendering instructions. The HTML or plain text rendering instructions may, rather than include instructions for generating dynamic content 115, include instructions for causing a recipient client device to display the URL location where the poll is stored so that a user can navigate, outside messaging client module 122 (e.g., via a web browser) to the poll to respond or view results.

In response to the user command to view the e-mail from Alice, messaging client module 122 generates a rendering of the e-mail from Alice, shown as renderings 114 of FIGS. 1A-1C. Messaging client 122 outputs, for display at UID 112, renderings 114.

Messaging client module 122 generates the rendering of the e-mail from Alice in one of two ways. In the first way, messaging client module 122 uses the HTML or plain text instructions, and in the second way, messaging client module 122 uses the AMP instructions.

For example, messaging client module 122 generates the rendering of the e-mail from Alice by at least rendering the HTML or plain text instructions, while refraining from rendering the AMP instructions, in response to determining that the AMP instructions are not valid AMP instructions. For example, if messaging client cannot validate the AMP instructions, messaging client module 122 refrains from generating renderings 114 including dynamic content 115, and instead displays the body of the e-mail and a URL to the poll as defined by the HTML or plain text instructions.

As another example, messaging client module 122 generates the rendering of the e-mail from Alice by at least rendering the HTML or plain text instructions, while refraining from rendering the AMP instructions, in response to determining that the AMP instructions require messaging client module 122 to first obtain user credentials to access secure content referenced by the AMP instructions. For example, if the poll requires a user login or some other credential, at least until messaging client module 122 obtains the user credentials for accessing the secure content, messaging client module 122 will not render the AMP instructions that require the user credentials and instead only render the HTML or plain text instructions.

As yet another example, generates the rendering of the e-mail from Alice by at least rendering the HTML or plain text instructions when messaging client module 122 is configured to never render AMP instructions or, to render HTML or plain text instructions by default. For instance, some messaging clients may be configured to only render e-mail as plain text (e.g., to improve speed, conserve battery, etc.). A user may change a preference setting associated with messaging client module 122 or an administrator may configure messaging client module 122 in this way.

Conversely, messaging client module 122 may generate the rendering of the e-mail from Alice by at least rendering the AMP instructions, while refraining from rendering the HTML or plain text instructions, in response to at least one of the following: determining that the AMP instructions are valid AMP instructions, determining that messaging client module 122 is configured to render AMP instructions, and after obtaining user credentials for accessing the secure content referenced by the AMP instructions. For example, during rendering, messaging client module 122 relies on a validator (that executes at computing device 110, message system 160, or some other remote computing device connected to network 130) checks the AMP instructions embedded in an e-mail to determine whether or not the AMP instructions comply with the AMP specification. If the AMP instructions comply with the AMP specification, the validator reports to message client module 122 whether the instructions are safe for rendering. As another example, messaging client module 122 renders the AMP instructions after obtaining user credentials needed to reference protected content indicated in the AMP instructions. As yet another example, messaging client module 122 renders the AMP instructions after determining that a user or administrator has enabled AMP rendering within a preference setting of messaging client module 122.

In this way, FIGS. 1A-1C show how an example computing system provides a secure environment for rendering electronic message content that is dynamic or facilitates user interactions. Such an example computing system may improve electronic communications by enabling electronic communications to have a secure form of engaging, dynamic content as well as an alternate form of static content when rendering the dynamic content is not appropriate. By enabling AMP based electronic communications, particularly for e-mail communication, message content can be interactive, dynamic and not become stale. Instead, the dynamic message content can update as information changes and a user can interact with the dynamic message content from within the message itself.

Furthermore, because all AMP instructions being used to generate AMP content are, by definition, validated and pass an AMP security review before rendering, AMP instructions are inherently secure, particularly when compared to standard HTML or other non-AMP forms of instructions. By providing dynamic content in electronic messages, the example computing system may therefore reduce user inputs and network traffic that would result if static content, such as a hyperlink or URL, was shown in place of the dynamic content. Therefore, not only do the described techniques provide a less frustrating more enjoyable user experience for enjoying message content, the example computing system may further provide a more efficient, as well as, secure environment for exchanging electronic communications.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
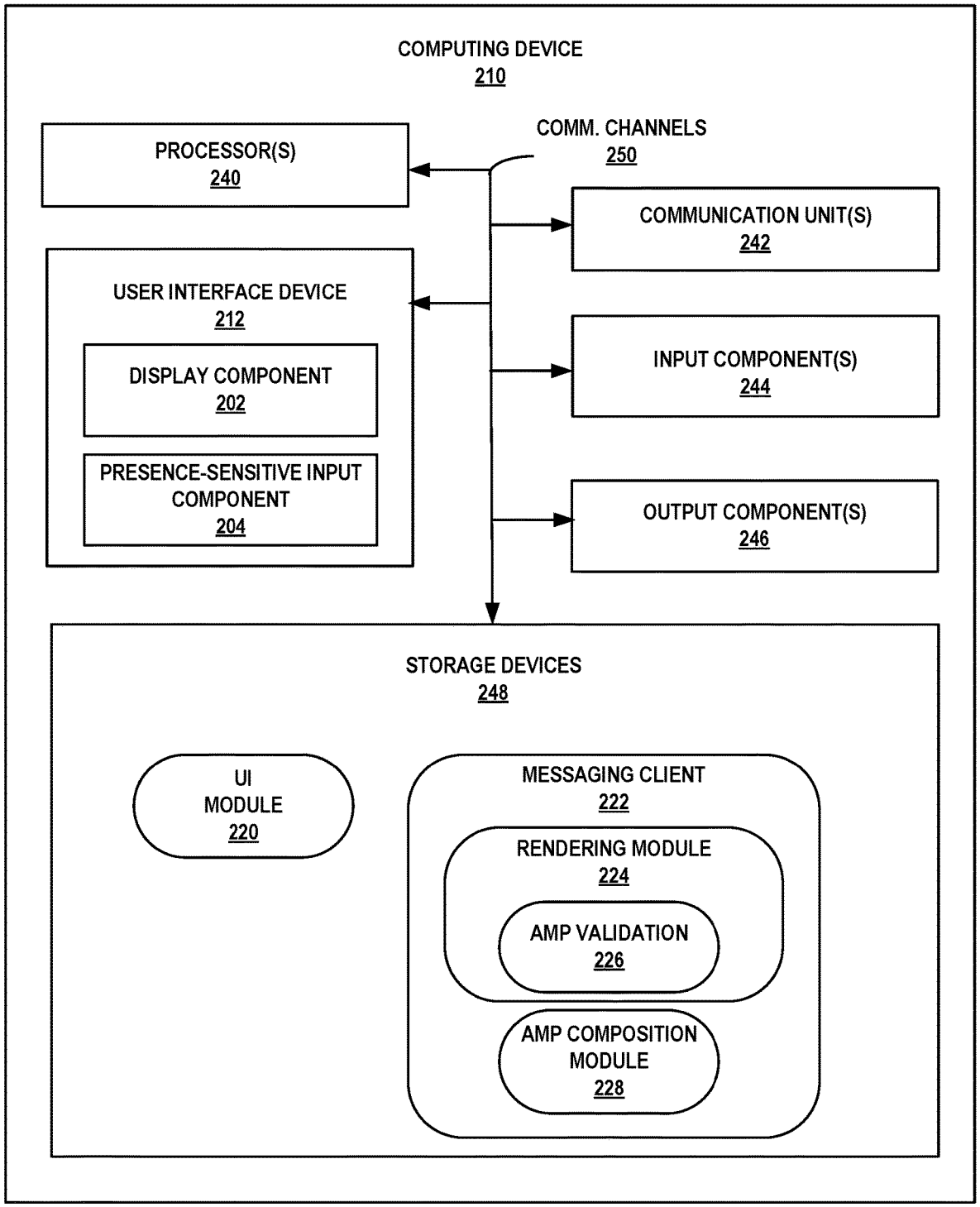
FIG. 2 is a block diagram illustrating an example computing device that is configured to exchange electronic communications that include a secure form of dynamic electronic messaging content, in accordance with one or more aspects of the present disclosure.

FIG. 2 is a block diagram illustrating an example computing device that is configured to exchange electronic communications that include a secure form of dynamic electronic messaging content, in accordance with one or more aspects of the present disclosure. Computing device 210 of FIG. 2 is described below as an example of computing device 110 of FIGS. 1A-1C. FIG. 2 illustrates only one example of computing device 210, and many other examples of computing device 210 may be used in other instances. Computing device 210 may include a subset of the components included in FIG. 2 or may include additional components not shown in FIG. 2.

As shown in the example of FIG. 2, computing device 210 includes UID 212, one or more processors 240, one or more communication units 242, one or more input components 244, one or more output components 246, and one or more storage components 248. UID 212 includes display component 202 and presence-sensitive input component. Storage components 248 of computing device 210 include UI module 220, and messaging client module 222. Messaging client module 222 includes rendering module 224 which includes AMP validation module 226. Messaging client module 222 also includes AMP composition module 228.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a UID), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a UID, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202 and presence-sensitive input component 204. Display component 202 may be a screen at which information is displayed by UID 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, UID 212 may present a user interface (such as user interfaces 113 of FIGS. 1A-1C).

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device.

Modules 220, 222, 224, 226, and 228 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, and 228. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, and 228 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated modules 220, 222, 224, 226, and 228. Storage components 248 may include a memory configured to store data or other information associated with modules 220, 222, 224, 226, and 228.

UI module 220 may include all functionality of UI module 120 of computing device 110 of FIG. 1 and may perform similar operations as UI module 120 for managing a user interface (e.g., user interfaces 113) that computing device 210 provides at UID 212 for handling input from a user. For example, UI module 220 of computing device 210 may receive instructions from messaging client module 222 to display user interfaces 113 and included with the instructions, receive an indication of one or more of renderings 114. UI module 220 may receive the instructions for displaying user interfaces 113 via communication channels 250. UI module 220 may transmit display commands and data over communication channels 250 to cause UID 212 to present user interfaces 113 at UID 212.

In some examples, UI module 220 may receive an indication of one or more user inputs detected at UID 212 and may output information about the user inputs to messaging client module 222 or any other application or component of computing device 210 for which the user inputs are intended. For example, UID 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated with dynamic content 115. UI module 220 may send an indication of the one or more touch events to messaging client module 222 for further interpretation. Messaging client 22 may determine, based on the touch events received from UI module 220, that the detected user input represents a user interaction with dynamic content 115.

Messaging client module 222 may include all functionality of messaging client module 122 of computing device 110 of FIGS. 1A-1C. For instance, messaging client module 222 may perform similar operations as messaging client module 122 for accessing, or providing, a messaging service to computing device 210.

Rendering module 224 of messaging client module 222 renders content for display by computing device 210. In other words, rendering module 224 generates renderings of rendering instructions or display data and sends the generated renderings to UI module 20 to cause UID 12 to display an image of the generated renderings at UID 12.

Rendering module 224 may render, as content, rendering instructions having one or more attributes and/or elements that each specify respective content in accordance with a markup language, such as hypertext markup language (HTML), extensible markup language (XML), plain text, AMP HTML, or other types of languages. For instance, rendering engine module 224 may parse HTML or AMP rendering instructions for content bounded by elements having attributes, apply presentation properties to the content, and otherwise format the content to produce a rendering of the content for display.

Rendering engine module 224 includes AMP validation module 226. AMP validation module 226 is a runtime validator that checks whether or not AMP instructions contain valid or secure AMP HTML that satisfies the AMP specification. Although shown and described as executing locally as part of computing device 210, in other examples, AMP validation module 226 may execute at message system 160 or at some other remote computing device connected to network 130. For example, to improve security of the rendering process, AMP validation module 226 may execute at a secure remote computing system that is less susceptible to malicious attack and therefore provide a more secure validation of rendering instructions. When rendering module 224 is tasked to render AMP instructions, rendering engine module 224 requests AMP validation module 226 to provide an indication as to whether the AMP instructions conform to the AMP specification and are therefore, valid and secure AMP instructions. Rendering AMP instructions may involve three components: AMP HTML which is a standard HTML with web components; AMP JavaScript (or simply AMP JS) functions which manages resource loading for the AMP HTML; and AMP caches which can serve and validate AMP HTML.

AMP HTML is a custom, and approved form of HTML that has been adapted to include custom AMP properties. That is, though many tags in AMP HTML instructions are regular HTML tags, AMP HTML replaces some traditional HTML tags with AMP-specific tags, called AMP HTML components. For example, the "amp-img" tag provides full srcset support even in devices and applications that do not support srcset. Unlike traditional HTML, AMP HTML has been vetted by stake holders to provide fast and secure rendering of content.

The AMP JS library enables quick rendering of AMP HTML instructions. AMP rendering instructions by definition cannot include any custom, user-authored JavaScript. Instead of using JavaScript per se, interactive features in an AMP rendering are generated by making use of predefined AMP elements. The predefined AMP elements rely on JavaScript code, however the JavaScript code has been designed to make sure its execution does not cause performance degradation. The vetted and secure functions in the AMP JS library implement all of AMP's best performance practices, manage resource loading, and provide the rendering device with the custom tags mentioned above, all to ensure a fast and secure rendering of AMP HTML. Among some benefits of AMP JS functions are that AMP JS enables asynchronous loading of information from resources, so the loading and rendering of a single element in AMP HTML instructions cannot prevent the loading and rendering of another element in the AMP HTML instructions. Other performance benefits of AMP JS include the sandboxing of all iframes, the pre-calculation of a layout of every element in a set of instructions before resources are loaded, and the disabling of slow cascade style sheet (CSS) selectors.

In some cases, an AMP Cache is used to serve cached AMP HTML renderings to client devices such as computing devices 110 and 210. An AMP Cache is a proxy-based content delivery network for delivering all valid AMP documents. In some cases, an AMP cache executes locally as part of computing devices 110 or 210 and in other cases the AMP cache executes remotely at messaging system 160 or some other remote system. An AMP Cache fetches AMP HTML pages, caches them, and improves page performance automatically so that a client device does not need to render the AMP instructions locally. When using an AMP Cache, all of the AMP instructions, including AMP JS files and content referenced therein is retrieved from a same origin.

Rendering module 222 includes validation module 224. Validation module 224 is a built-in validation system that confirms that what appear to be AMP instructions, are guaranteed to work, do not depend on external (non-AMP) resources, and do not include non-AMP (and potentially malicious) code. The validation system runs a series of assertions confirming AMP instructions meet the AMP HTML specification. If validation module 224 cannot validate AMP rendering instructions, rendering module 222 renders instead the plain text or other HTML instructions. If however validation module 224 validates a set of AMP rendering instructions, rendering module 222 then renders instead the AMP instructions accordingly.

In addition to rendering module 222, messaging client module 222 includes AMP composition module 228. AMP composition module 228 enables messaging client module 222 to have an interface from which a user can compose electronic messages that include AMP rendering instructions. For example, AMP composition module 228 may store, template AMP elements that a user can select from a user interface and insert the template AMP elements when composing an e-mail. Examples of the template AMP elements include: interactive polls, weather widgets, map widgets, streaming video widgets, document collaboration widgets (to enable collaboration on a shared document from within an e-mail), and various other types of template AMP elements and widgets. Use of the template AMP elements enables novice users to benefit from adding dynamic content to their messages without having to know how to write AMP code.

AMP composition module 228 may cause messaging client module 222 to include a compose bar or other user interface entry point for selecting and inserting predefined AMP template documents. A user may click on a button in such a compose bar to insert: interactive online videos, a link to a presentation or other shared file, a request for payment, a piece of a map, an executable, etc. The compose bar may further enable a user to select and install various AMP add-ons so as to increase the capability and catalog of predefined AMP template documents.

Figure 3:
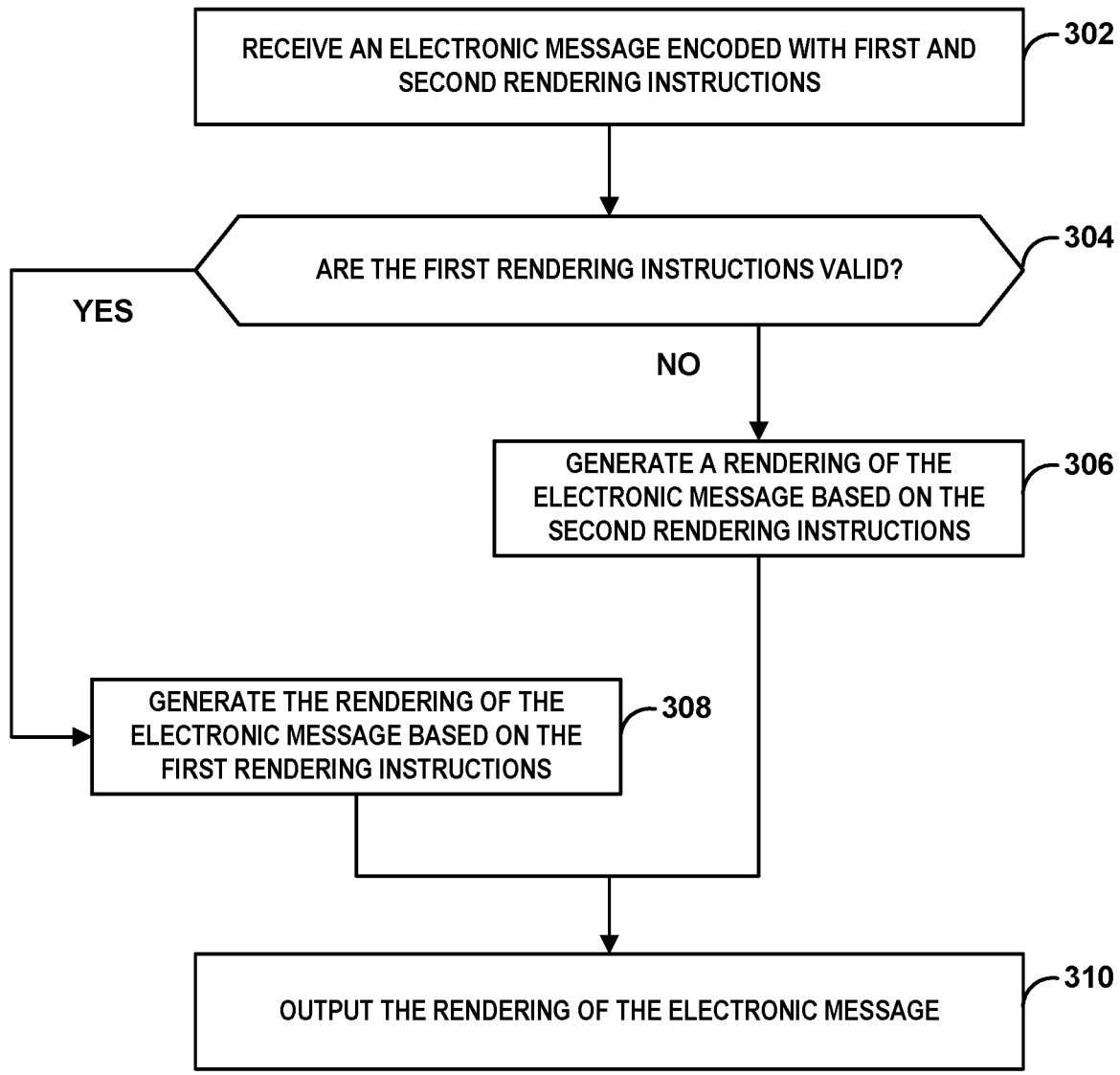
FIGS. 3-5 are flowcharts illustrating example operations performed by an example computing device that is configured to exchange electronic communications that include a secure form of dynamic electronic messaging content, in accordance with one or more aspects of the present disclosure.
Figure 4:
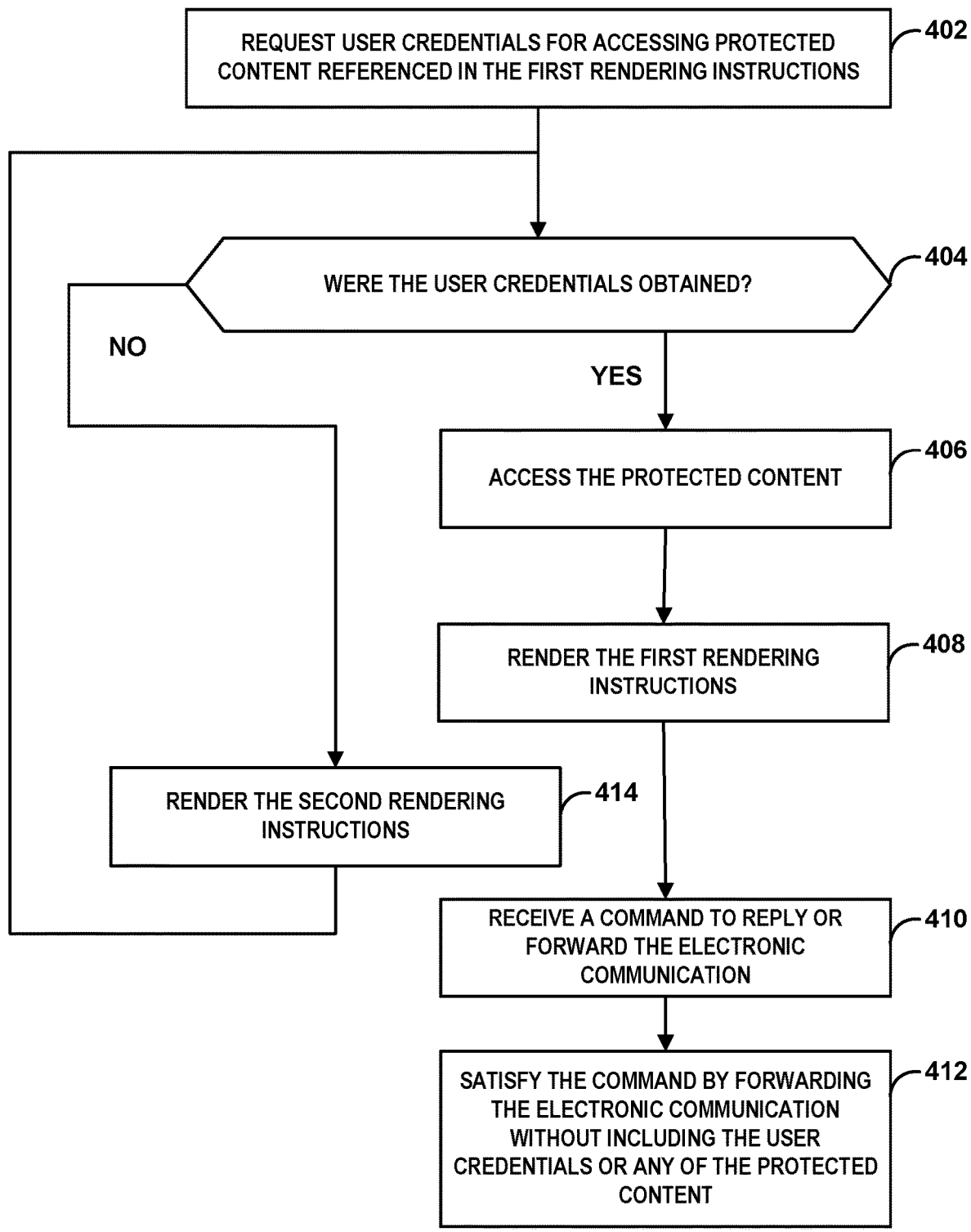
Figure 5:
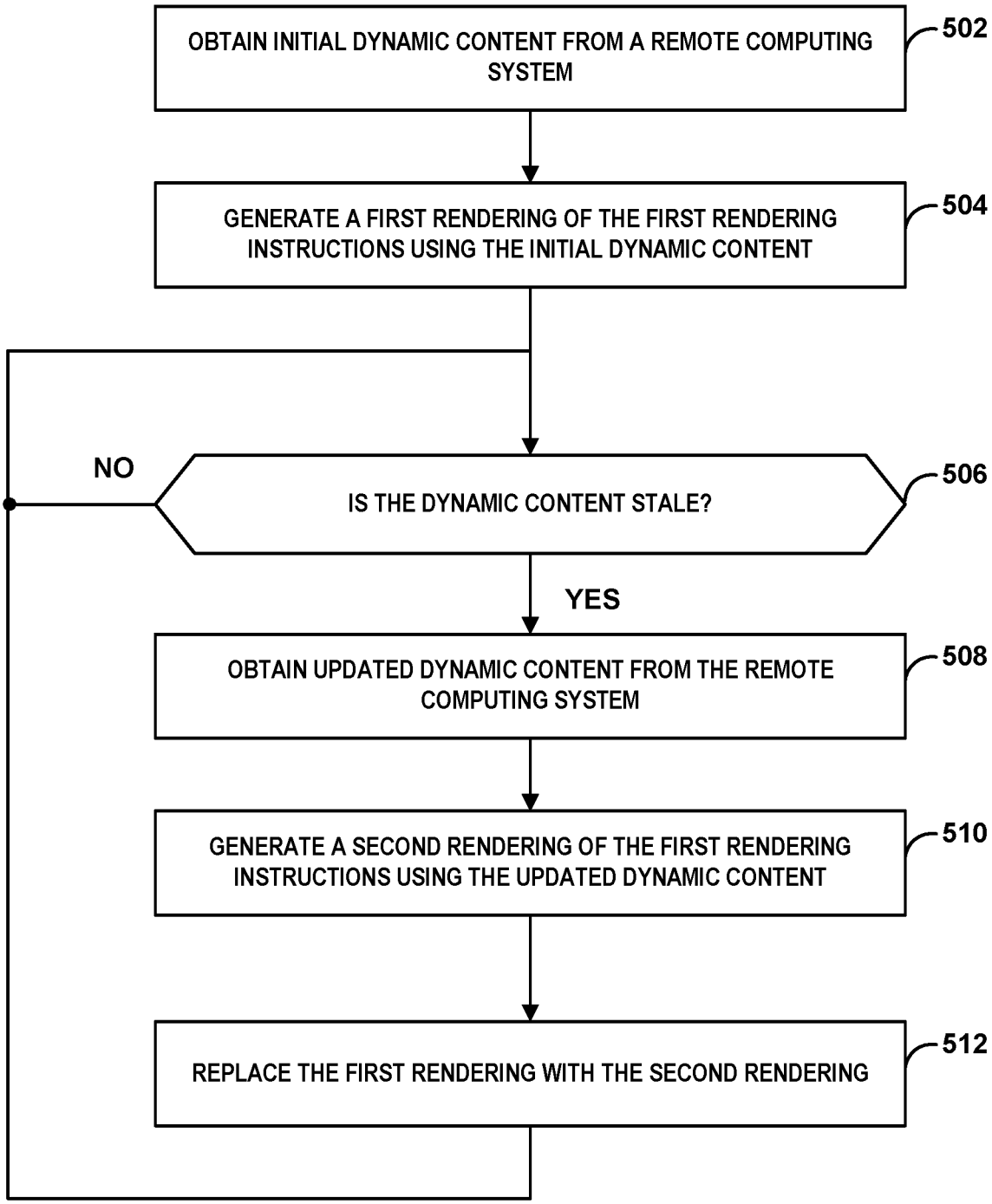

FIGS. 3-5 are flowcharts illustrating example operations performed by an example computing device that is configured to exchange electronic communications that include a secure form of dynamic electronic messaging content, in accordance with one or more aspects of the present disclosure. Each of FIGS. 3-5 are described below in the context of computing device 110 of FIG. 1A and computing device 210 of FIG. 2.

With regards to FIG. 3, and in accordance with techniques of this disclosure, a messaging client receives an electronic message encoded with first and second rendering instructions (302). For example, messaging client module 222 may receive an e-mail message. Part of the e-mail message may include first rendering instructions, which are AMP rendering instructions, and the other part may include second rendering instructions, that are HTML or plain text rendering instructions. Messaging client module 222 may generate a rendering of the electronic message content by generating either a rendering of the first rendering instructions or a rendering of the second rendering instructions.

Messaging client module 222 determines whether the first instructions are valid (304). For example, validation module 226 of rendering module 224 may check the AMP rendering instructions to determine whether any user-authored JavaScript or other code that does not conform to the AMP specification is included in the AMP rendering instructions. Validation module 226 may parse the AMP rendering instructions for elements, attributes, or function calls that are not supported by the AMP HTML specification or the AMP JS library. Although shown and described as executing locally as part of computing device 210, in other examples, AMP validation module 226 may execute at message system 160 or at some other remote computing device connected to network 130.

In response to determining that the first rendering instructions are not valid (304, NO branch), messaging client module 222 refrains from rendering the first rendering instructions and instead renders the second rendering instructions (306). For example, AMP validation module 226 may determine that while generally, the AMP rendering instructions conform to the AMP specification, one or more aspects of the AMP rendering instructions could be corrupted, include malicious code, or otherwise not comply with the AMP specification. In such a case, AMP validation module 226 sends information to rendering module 224 that prevents rendering module 224 from rendering the AMP rendering instructions.

In response to determining that the first rendering instructions are valid (304, YES branch), messaging client module 222 refrains from rendering the second rendering instructions and instead renders the first rendering instructions (308). For example, AMP validation module 226 may determine that the AMP rendering instructions conform to the AMP specification, do not appear to be corrupted, do not seem to include any malicious code, and otherwise comply with the AMP specification. In such a case, AMP validation module 226 sends information to rendering module 224 that causes rendering module 224 to generate a rendering of the AMP rendering instructions.

After generating a rendering of the electronic message, messaging client module 222 outputs, for display, the rendering of the electronic message (310). For example, messaging client module 222 sends the rendering to UI module 220 to cause UID 212 to display the rendering at display component 202.

With regards to FIG. 4, and in accordance with techniques of this disclosure, sometimes, even if the first rendering instructions are valid AMP instructions, the first rendering instructions may reference or need to access protected content from a remote location or service. In order to access the protected content, messaging client may need to obtain the user credentials needed to login or otherwise access the protected content. For instance, AMP instructions may reference information contained on a social media network. The information may be accessible only to certain users of the social media network. Messaging client module 222 may need to request the credentials of a user of messaging client module 222 in order to access the social media network and obtain the protected information.

As shown in FIG. 4, messaging client module 222 requests user credentials for accessing protected content referenced in the first rendering instructions (402). For example, before rendering the AMP instructions in an electronic communication, messaging client module 222 may cause UI module 220 and UID 212 to generate a login box or other user interface element for requesting and obtaining the user credentials.

Messaging client module 222 determines whether the user credentials were obtained (404). If the user has not produced his or her credentials (404, NO branch), messaging client module 222, may generate a rendering of the second rendering instructions while waiting for the credentials (414) and output the rendering for display. For example, rather than not showing any rendering of an electronic message, messaging client module 222 may default to rendering the non-AMP rendering instructions until messaging client module 222 has obtained all the information needed to generate the rendering of the AMP rendering instructions.

Responsive to obtaining the user credentials (404, YES branch), messaging client module 222 uses the user credentials to access the protected content (406) and render the first rendering instructions while refraining from rendering the second rendering instructions (408). In other words, messaging client module 222 may cause UI module 220 and UID 212 to output a second rendering of the electronic message based on the AMP rendering instructions, to replace the first rendering generated from the non-AMP rendering instructions. UI module 220 may cause UID 212 to replace the first rendering with the second rendering. For example, messaging client module 222 may access the service or remote location at which the protected content referenced by the AMP instructions is stored using the credentials received from the user and use the protected content to generate the AMP rendering.

The protected content obtained using the user credentials may be particularly sensitive to a user. The user may not want to share the protected content with any other users. That said, the user may whish to share the electronic communication that references the protected content in the AMP rendering instructions with another user. In order to protect the user's information, messaging client module 222 may refrain from forwarding the user credentials or forwarding the protected content when forwarding an electronic communication on to another recipient. Said differently, messaging client module 222 may determine that computing device 210 received a command to reply or forward the electronic communication (410), and in response, messaging client module 222 may satisfy the command by replying or forwarding the electronic communication without including the user credentials or any of the protected content (412). Messaging client module 222 forwards the electronic message without retaining the user credentials.

With regards to FIG. 5, and in accordance with techniques of this disclosure, messaging client module 222 obtains dynamic content from a remote computing system, such as messaging system 160 or some other computing system connected to network 130, to complete rendering the first rendering instructions (502). For example, the dynamic content from the remote computing system may be a weather forecast, poll results, order tracking, package tracking, shipping information, news updates, other informational updates, price changes for goods, travel delay information, personal or shared calendars, electronic invitations, or any other type of information that may change over time. In order to provide up-to-date content that is not stale, messaging client module 222 generates an initial rendering of the AMP rendering instructions included in an electronic message using the dynamic content initially obtained from the remote computing system.

Messaging client module 222 determines whether the dynamic content obtained to complete a rendering of AMP rendering instructions is stale (506). For instance, periodically, occasionally, or in response to receiving information from the remote computing system at which the dynamic content was initially obtained, messaging client module 222 determines that the dynamic content needs refreshing and therefore a new rendering of the AMP rendering instructions needs generating. In some cases, messaging client module 222 checks whether content referenced in AMP instructions is out-of-date or has changed every time a user provides input to cause computing device 210 to display a graphical indication of the message. In some cases, messaging client module 222 automatically checks whether content referenced in AMP instructions is out-of-date or has changed without necessarily waiting for user input associated with the electronic message.

If the dynamic content is not stale (506, NO branch), messaging client module 222 continues to display the original rendering. However, if messaging client module 222 determines that the dynamic content needs refreshing (506, YES branch), messaging client module 222 obtains updated dynamic content from the remote computing system (508). Said differently, after causing computing device 210 to output the rendering of the electronic message for display based on the AMP rendering instructions, messaging client module 222 obtains second dynamic content from the remote computing system to generate a second rendering of the electronic message.

Messaging client module 222 generates the second rendering of the electronic message by at least rendering, using the second dynamic content, the first rendering instructions, while refraining from rendering the second rendering instructions (510). Messaging client module 222 outputs the second rendering to UI module 220 for display by UID 212 to replace the first rendering. UID 212 replaces the first rendering with the second rendering (512).

In some cases, it may not be obvious to a user that dynamic content of an electronic message has changed since the last time he or she viewed the content. To indicate when dynamic content has changed (e.g., to indicate when a first rendering has been replaced by a second rendering with more recent dynamic content), messaging client module 222 may cause the second rendering of the electronic message to be displayed with a graphical indication that has similar properties to graphical indications that are displayed for new messages when the new messages show up in a message thread that includes the electronic message. For instance, an unread message (e.g., one that has not been viewed or otherwise accessed by a user) in a message thread may be associated with a bold type faced heading whereas a read message (e.g., one that has been viewed or otherwise accessed by the user) may be associated with a regular (not bold) type faced heading. After updating the dynamic content in a read message, messaging client module 222 may cause the electronic message to have a bold type faced heading so it appears like any other unread message in the thread.

In some cases, to further distinguish to indicate to a user that dynamic content has changed, messaging client module 222 may cause such a second rendering of an electronic message to take a similar form or appearance as a graphical indication for a new message by displacing more recent messages in the message thread. In other words, even though the message was not recently received, messaging client module 222 may cause the updated message to appear to be a new message that was recently received by messaging client module 222.

FIG. 6 is a conceptual diagram illustrating example rendering instructions of an electronic message, in accordance with one or more aspects of the present disclosure. In the example of FIG. 6, rendering instructions 600 include two types of rendering instructions. One type of rendering instructions are HTML or plain text rendering instructions 602. The other type of rendering instructions are AMP rendering instructions 604. FIG. 6 merely shows an example of how rendering instructions of an electronic message may be divided into multiple parts so that if a messaging client determines to render AMP instructions 604, it can. Alternatively, the messaging client may render HTML or plain text rendering instructions 602 when the messaging client determines that rendering of AMP instructions 604 is not appropriate.

Clause 1. A method comprising: receiving, by a mail client executing at a computing device, an electronic message encoded with first rendering instructions and second rendering instructions, the first rendering instructions being accelerated mobile pages instructions and the second rendering instructions being at least one of plain text or hypertext markup language instructions; generating, by the mail client, a rendering of the electronic message by at least: rendering the second rendering instructions, while refraining from rendering the first rendering instructions, in response to determining that the first rendering instructions are not valid accelerated mobile pages instructions; and outputting, by the mail client, for display, the rendering of the electronic message.

Clause 2. The method of clause 1, wherein generating the rendering of the electronic message further comprises rendering the first rendering instructions, while refraining from rendering the second rendering instructions, in response to determining that the first rendering instructions are valid accelerated mobile pages instructions.

Clause 3. The method of clause 2, wherein rendering the first rendering instructions, while refraining from rendering the second rendering instructions, in response to determining that the first rendering instructions are valid accelerated mobile pages instructions further comprises: requesting, based on the first rendering instructions, user credentials for accessing protected content referenced in the first rendering instructions; and responsive to obtaining the user credentials, using the user credentials to render the first rendering instructions while refraining from rendering the second rendering instructions.

Clause 4. The method of clause 3, further comprising: responsive to not obtaining the user credentials, rendering the second rendering instructions, while refraining from rendering the first rendering instructions.

Clause 5. The method of any one of clauses 3 or 4, wherein the rendering is a first rendering, the method further comprising: while waiting for the user credentials, generating the first rendering of the electronic message by rendering the second rendering instructions while refraining from rendering the first rendering instructions; and after receiving the user credentials: generating a second rendering of the electronic message by rendering the first rendering instructions, using the user credentials; and outputting, by the mail client, for display to replace the first rendering, the second rendering of the electronic message.

Clause 6. The method of any one of clauses 3-5, further comprising: forwarding the electronic message without retaining the user credentials.

Clause 7. The method of clause 6, wherein forwarding the electronic message without retaining the user credentials includes omitting any protected information obtained using the user credentials from the electronic communication.

Clause 8. The method of any one of clauses 2-7, wherein rendering the first rendering instructions, while refraining from rendering the second rendering instructions, in response to determining that the first rendering instructions are valid accelerated mobile pages instructions comprises: obtaining dynamic content from a remote computing system to complete rendering the first rendering instructions.

Clause 9. The method of clause 8, wherein the rendering is a first rendering, and the dynamic content is first dynamic content, the method further comprising: after outputting the rendering of the electronic message for display, obtaining second dynamic content from the remote computing system to generate a second rendering of the electronic message; generating, by the mail client, the second rendering of the electronic message by at least rendering, using the second dynamic content, the first rendering instructions, while refraining from rendering the second rendering instructions; and outputting, by the mail client, for display to replace the first rendering, the second rendering of the electronic message.

Clause 10. The method of clause 9, wherein outputting the second rendering of the electronic message comprises displaying the second rendering of the electronic message as a graphical indication of a new message in a message thread that includes the electronic message.

Clause 11. The method of clause 10, wherein displaying the second rendering of the electronic message as a graphical indication of a new message in a message thread that includes the electronic message comprises displacing more recent messages in the message thread to display the graphical indication of the new message.

Clause 12. A computing device comprising at least one processor configured to perform any one of the methods of clauses 1-11.

Clause 13. A computer-readable storage medium comprising instructions that when executed, cause at least one processor of a computing device to perform any one of the methods of clauses 1-11.

Clause 14. A system comprising means for performing any one of the methods of clauses 1-11.

Clause 15. A computer program comprising program instructions that, when executed on a computer, cause the computer to perform the method of any one of claims 1-11.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
  receiving, by a mail client executing at a computing device, an electronic message encoded with first rendering instructions and second rendering instructions, the first rendering instructions being accelerated mobile pages instructions and the second rendering instructions being at least one of plain text or hyper-text markup language instructions;
  determining, by the mail client, whether the first rendering instruction are valid accelerated mobile pages instructions that conform to an accelerated mobile pages specification;
  in response to determining that the first rendering instruction are not valid accelerated mobile pages instructions that conform to the accelerated mobile pages specification, generating, by the mail client, a rendering of the electronic message by at least rendering the second rendering instructions, while refraining from rendering the first rendering instructions;
  in response to determining that the first rendering instruction are valid accelerated mobile pages instructions that conform to the accelerated mobile pages specification, generating, by the mail client, the rendering of the electronic message by at least rendering the first rendering instructions, while refraining from rendering the second rendering instructions; and
  outputting, by the mail client, for display, the rendering of the electronic message.

2. The method of claim 1, wherein generating the rendering of the electronic message by at least rendering the first rendering instructions, while refraining from rendering the second rendering instructions comprises:
  requesting, based on the first rendering instructions, user credentials for accessing protected content referenced in the first rendering instructions; and
  responsive to obtaining the user credentials, using the user credentials to generate the rendering of the electronic message by at least rendering the first rendering instructions while refraining from rendering the second rendering instructions.

3. The method of claim 2, further comprising:
  responsive to not obtaining the user credentials, generating the rendering of the electronic message by at least rendering the second rendering instructions, while refraining from rendering the first rendering instructions.

4. The method of claim 2, wherein the rendering is a first rendering, the method further comprising:
  while waiting for the user credentials, generating the first rendering of the electronic message by rendering the second rendering instructions while refraining from rendering the first rendering instructions;
  after receiving the user credentials, generating a second rendering of the electronic message by rendering the first rendering instructions, using the user credentials; and
  outputting, by the mail client, for display to replace the first rendering, the second rendering of the electronic message.

5. The method of claim 2, further comprising:
  forwarding the electronic message without retaining the user credentials.

6. The method of claim 5, wherein forwarding the electronic message without retaining the user credentials includes omitting any protected information obtained using the user credentials from the electronic message.

7. The method of claim 1, wherein generating a rendering of the electronic message by at least rendering the first rendering instructions, while refraining from rendering the second rendering instructions comprises:
  obtaining dynamic content from a remote computing system to complete rendering the first rendering instructions.

8. The method of claim 7, wherein the rendering is a first rendering, and the dynamic content is first dynamic content, the method further comprising:
  after outputting the rendering of the electronic message for display, obtaining second dynamic content from the remote computing system to generate a second rendering of the electronic message;
  generating, by the mail client, the second rendering of the electronic message by at least rendering, using the second dynamic content, the first rendering instructions, while refraining from rendering the second rendering instructions; and
  outputting, by the mail client, for display to replace the first rendering, the second rendering of the electronic message.

9. The method of claim 8, wherein outputting the second rendering of the electronic message comprises displaying the second rendering of the electronic message as a graphical indication of a new message in a message thread that includes the electronic message.

10. The method of claim 9, wherein displaying the second rendering of the electronic message as a graphical indication of a new message in a message thread that includes the electronic message comprises displacing more recent messages in the message thread to display the graphical indication of the new message.

11. A computing device comprising:
  a display; and
  at least one processor configured to execute a mail client configured to:

receive an electronic message encoded with first rendering instructions and second rendering instructions, the first rendering instructions being accelerated mobile pages instructions and the second rendering instructions being at least one of plain text or hyper-text markup language instructions;

determine whether the first rendering instruction are valid accelerated mobile pages instructions that conform to an accelerated mobile pages specification;

in response to determining that the first rendering instruction are not valid accelerated mobile pages instructions that conform to the accelerated mobile pages specification, generate a rendering of the electronic message by at least rendering the second rendering instructions, while refraining from rendering the first rendering instructions;

in response to determining that the first rendering instruction are valid accelerated mobile pages instructions that conform to the accelerated mobile pages specification, generate the rendering of the electronic message by at least rendering the first rendering instructions, while refraining from rendering the second rendering instructions; and output, using the display, the rendering of the electronic message.

12. The computing device of claim 11, wherein the mail client is further configured to render the first rendering instructions, while refraining from rendering the second rendering instructions by at least:

requesting, based on the first rendering instructions, user credentials for accessing protected content referenced in the first rendering instructions; and responsive to obtaining the user credentials, using the user credentials to render the first rendering instructions while refraining from rendering the second rendering instructions.

13. The computing device of claim 12, wherein the mail client is further configured to:

responsive to not obtaining the user credentials, render the second rendering instructions, while refraining from rendering the first rendering instructions.

14. The computing device of claim 12, wherein the rendering is a first rendering, and the mail client is further configured to:

while waiting for the user credentials, generate the first rendering of the electronic message by rendering the second rendering instructions while refraining from rendering the first rendering instructions;

after receiving the user credentials, generate a second rendering of the electronic message by rendering the first rendering instructions, using the user credentials; and output, using the display, to replace the first rendering, the second rendering of the electronic message.

15. The computing device of claim 12, wherein the mail client is further configured to forward the electronic message without retaining the user credentials.

16. A computer-readable storage medium comprising instructions associated with a mail client, that when executed, cause at least one processor of a computing device to:

receive an electronic message encoded with first rendering instructions and second rendering instructions, the first rendering instructions being accelerated mobile pages instructions and the second rendering instructions being at least one of plain text or hyper-text markup language instructions;

determine whether the first rendering instruction are valid accelerated mobile pages instructions that conform to an accelerated mobile pages specification;

in response to determining that the first rendering instruction are not valid accelerated mobile pages instructions that conform to the accelerated mobile pages specification, generate a rendering of the electronic message by at least rendering the second rendering instructions, while refraining from rendering the first rendering instructions;

in response to determining that the first rendering instruction are valid accelerated mobile pages instructions that conform to the accelerated mobile pages specification, generate the rendering of the electronic message by at least rendering the first rendering instructions, while refraining from rendering the second rendering instructions; and output, for display, the rendering of the electronic message.

17. The computer-readable storage medium of claim 16, wherein the instructions, when executed, cause the at least one processor to render the first rendering instructions, while refraining from rendering the second rendering instructions by at least:

requesting, based on the first rendering instructions, user credentials for accessing protected content referenced in the first rendering instructions; and responsive to obtaining the user credentials, using the user credentials to render the first rendering instructions while refraining from rendering the second rendering instructions.

* * * * *